Oct. 8, 1940.　　　　W. C. NABORS　　　　2,217,449
GROUND WORKING IMPLEMENT
Filed Sept. 20, 1938　　2 Sheets-Sheet 1
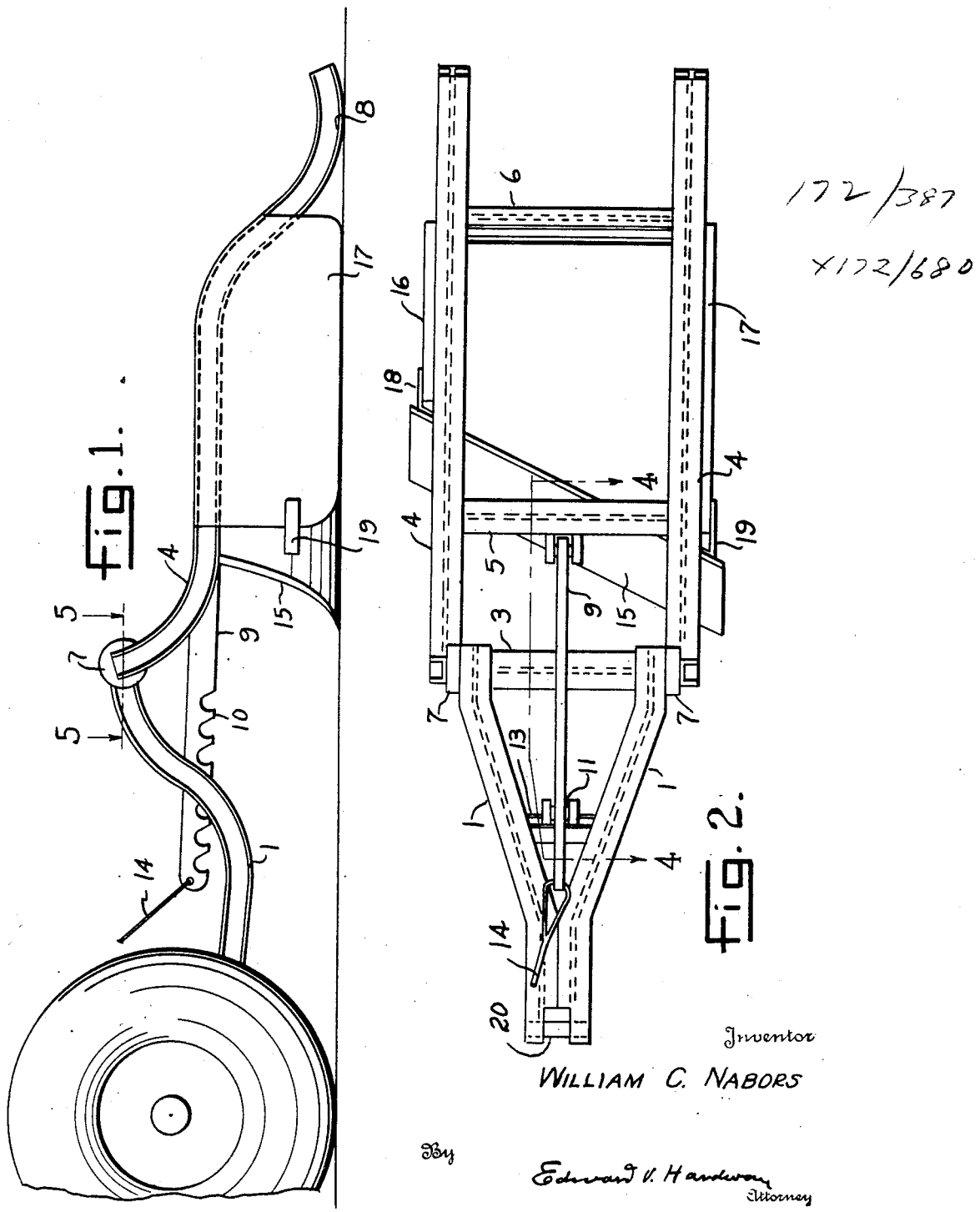
Inventor
WILLIAM C. NABORS
By
Edward V. Hardway
Attorney Oct. 8, 1940.                W. C. NABORS                2,217,449
                        GROUND WORKING IMPLEMENT
              Filed Sept. 20, 1938            2 Sheets-Sheet 2
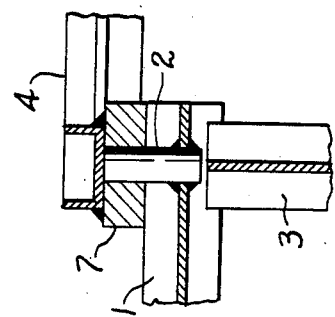
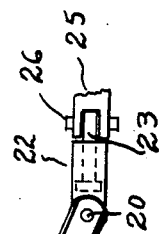
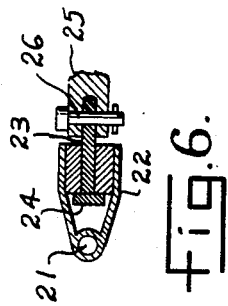
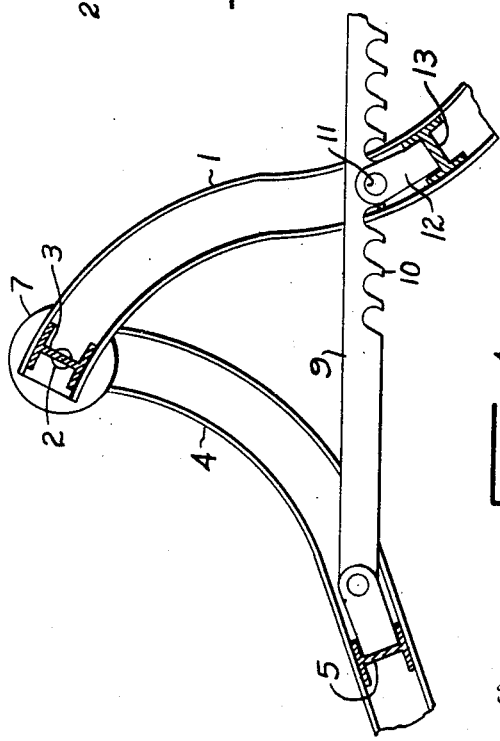
Inventor
WILLIAM C. NABORS Patented Oct. 8, 1940

2,217,449

UNITED STATES PATENT OFFICE 2,217,449

GROUND WORKING IMPLEMENT

William C. Nabors, Mansfield, La.

Application September 20, 1938, Serial No. 230,757

6 Claims. (Cl. 37—177)

This invention relates to a ground working implement.

An object of the invention is to provide an implement of the character described specially designed for cultivating, terracing or grading the ground, for the formation of ditches or for similar purposes.

Another object of the invention is to provide an implement of the character described having a novel type of framework which may be controlled by appropriate movements of the tractor, or draft vehicle so as to control the relation of the ground working tool, or tools, depending from the framework, to the ground surface.

It is another object of the invention to provide an implement of the character described having a novel type of framework, with means for locking the framework in a selected position to hold the ground working tool, or tools, in a selected relation with the ground surface or in inactive position above the ground surface.

With the above and other objects in view the invention has particular relation to certain novel features of construction, operation and arrangement of parts, an example of which is given in this specification and illustrated in the accompanying drawings, wherein:

Figure 1 shows a side view of the implement shown in its relation to the tractor.

Figure 2 shows a plan view.

Figure 3 shows a view of the framework locked in inactive position.

Figure 4 shows an enlarged, fragmentary, sectional view thereof taken on the line 4—4 of Figure 2.

Figure 5 shows a cross-sectional view taken on the line 5—5 of Figure 1, and

Figure 6 shows a longitudinal, sectional view of the hitch.

Referring now more particularly to the drawings wherein like numerals of reference designate the same parts in each of the figures, the numerals 1, 1 designate the side members of the front or A-frame which may be found of I-beams with their forward ends welded, or otherwise secured together and with their rear ends diverging. These rear ends have the outwardly extending spindles 2, preferably welded thereto. Said rear ends are connected by a transverse I-beam 3 whose ends may be welded, or otherwise secured thereto. The rear ends of the side members 1 are upwardly and rearwardly curved as more accurately shown in Figures 1, 3 and 4.

The framework also includes an approximately rectangular frame comprising the side members 4, 4 also preferably formed of I-beams which are connected by the cross-bars 5, 6 whose ends may be welded thereto. The forward ends of the side members 4, 4 have the inside bearing members 7, 7 welded thereto and provided with bearings to receive the spindles 2 whereby the front and rear frames, comprising the complete framework, may be pivotally connected together. The forward ends of the side members 4 are upwardly curved, as shown in Figures 1, 3 and 4 and their rear ends are reversely curved forming the runners 8 which are in contact with the ground surface. A latch bar 9 has its rear end pivotally connected to the cross-bar 5. Its under margin is formed with a series of slightly retracted teeth 10 which are engageable with a cross-rod 11 carried by the clevis 12 which, in turn, is secured to a cross-bar 13 between, and whose ends are welded to, the side members 1 of the A-frame. A controlling cable 14 may be connected to the free end of the latch bar and the cable may be manipulated by the driver of the tractor to release the latch bar 10 from the cross-rod 11 or to permit its engagement therewith.

It is evident that the two frames of the main framework may thus be latched together in any selected angular relation. Any type of ground working tools may be attached to and depend from the main frame depending on the character of work to be done. As shown a diagonally disposed grader 15 is supported from said frame with the vertically disposed blade-like land slides 16 and 17 secured to and depending from the side members 4, behind the grader, as shown with their forward ends connected to the grader 15 by the brackets 18, 19. The grader and land slides are shown for the purposes of illustration and as above stated other ground working tools may be substituted for same.

The forward ends of the side members 1 are spaced apart and connected by a cross-pin 20. This pin works through the rear bearing 21 of the coupling 22. This coupling has a rotatable pin 23 which is maintained against detachment from the coupling by the head 24 and the forward end of the pin is connected to the trailer hitch 25 by means of a vertical connecting pin 26 as shown in Figures 3 and 6 whereby the framework is connected to the tractor to pivot about a transverse or vertical axis as well as to rotate on a longitudinal axis. Freedom of movement of the framework relative to the tractor is thus provided and this is particularly desirable while working rough or uneven ground or during terracing or ditching operations.

It is, of course, desirable to control the depth at which the ground working tools operate. It is also desirable, at times, to elevate said tool, or tools, above the ground surface as, for example, when it is desired to merely transport the vehicle from place to place or when it is desirable to lift the tool, or tools, clear of an obstruction such as a rock, stump or the like. In order to so elevate the tool, or tools, it is merely necessary for the driver to reverse the tractor, that is, to move it rearwardly. The axes of the spindles 2, it will be noted, lies above the line of force thus produced so that upon rear movement of the tractor, the runners 8 being in frictional contact with the ground surface, the connected ends of the front and rear sections of the framework will be elevated as illustrated in Figures 3 and 4. During this movement the teeth 10, being retracted will readily ride over the cross-rod 11 but upon a subsequent forward movement of the tractor said cross-rod 11 will be at once engaged by a tooth and the framework will be locked in its elevated position. The obstruction, sought to be evaded, may thus be readily passed without injury to the tool, or tools, the framework riding at its rear end on the runners 8 and being supported at its forward end by the tractor hitch. When the obstruction is passed the operator of the tractor may lift the forward end of the latch bar 9 by means of a cable 14 to release it from the cross-rod 11 and thus permit the pivotally connected ends of the frames to descend the desired distance whereupon the latch bar 9 may be released to again engage the cross-rod 11 to lock the frames in their selected relation.

The drawings and description disclose what is now considered to be a preferred form of the invention by way of illustration only, while the broad principle of the invention will be defined by the appended claims.

What I claim is:

1. A ground working implement comprising a framework formed of sections in tandem relation, means whereby the sections may be pivoted together on a horizontal axis, ground runners on one section, means for connecting the other section to a draft vehicle, the pivotal connecting means being located above the transverse plane passing through the runners and draft vehicle connection, releasable means under the control of the vehicle operator for maintaining the sections in a selected angular relation and a ground working tool depending from one of said sections.

2. A ground working implement comprising a framework formed of substantially horizontal sections pivotally connected together on a horizontal axis, ground runners on one section, means for connecting the other section to a draft vehicle, said runners and connecting means being so related to the connection between the sections that upon rearward movement of the vehicle the connected ends of said sections will be elevated, and a ground working tool depending from one of the sections.

3. A device of the character described comprising a frame formed of front and rear sections, said front section having side members whose rear ends are upturned, and whose front ends converge, the rear section having parallel side members whose front end is upturned and whose rear ends are turned downwardly to form skids, means for pivotally connecting said upturned ends, a depending ground working tool connected to the rear section.

4. A device of the character described comprising a frame formed of front and rear sections, said front section having side members whose rear ends are upturned, and whose front ends converge, the rear section having parallel side members whose front end is upturned and whose rear ends are turned downwardly to form skids, means for pivotally connecting said upturned ends, a depending ground working tool connected to the rear section and releasable means for preventing rotation of the sections when the forward section is pulled by a draft vehicle.

5. A device of the character described comprising a framework formed with a forward section and a rear section in longitudinal alignment, said rear section being adapted to ride on the ground surface, means for pivotally connecting, on a horizontal axis, adjoining ends of the sections, a ground working tool depending from one of said sections, the connecting means being positioned substantially above the remote ends of the sections so that forward movement of the forward section and engagement of the tool with the ground surface will be effective to rotate the sections about the connection to positively force the tool into the ground, and also rearward movement of the forward section will be effective to rotate the sections about the connection to raise said tool above the ground, and releasable means for preventing said rotation in one direction.

6. A ground working implement comprising a framework formed of forward and rearward sections, means pivotally connecting the adjacent ends of the sections together on a horizontal axis, ground working runners on the rearward section, means for connecting the forward end of the forward section to a draft vehicle, the connection between the sections being so related to the runners and the connection to the draft vehicle that upon rearward movement of the vehicle, the connected ends of said sections will be elevated, a ground working tool depending from one of the sections and releasable means for maintaining the sections in a constant relation upon forward movement of the implement.

WILLIAM C. NABORS.